United States Patent
Oku

[11] Patent Number: 5,242,002
[45] Date of Patent: Sep. 7, 1993

[54] PNEUMATIC RADIAL TIRE WITH BELT CORDS HAVING AT LEAST ONE SHAPE-MEMORY ALLOY FILAMENT

[75] Inventor: Masahiro Oku, Osaka, Japan

[73] Assignee: Sumitomo Rubber Industries, Ltd., Hyogo, Japan

[21] Appl. No.: 786,833

[22] Filed: Nov. 1, 1991

[30] Foreign Application Priority Data

Nov. 14, 1990 [JP] Japan ................. 2-306035

[51] Int. Cl.$^5$ .................. B60C 9/18; B60C 9/20
[52] U.S. Cl. .................... 152/527; 57/902; 148/402; 152/451
[58] Field of Search ............. 152/451, 527; 148/402, 148/563; 57/200, 212–221, 902

[56] References Cited

FOREIGN PATENT DOCUMENTS 0290328 11/1988 European Pat. Off. .
62-62989 3/1987 Japan .................... 57/200

Primary Examiner—Caleb Weston
Assistant Examiner—Adrienne C. Johnstone
Attorney, Agent, or Firm—Birch, Stewart, Kolasch & Birch

[57] ABSTRACT

A pneumatic radial tire is disclosed, including an annular tread having a belt incorporated therein, a pair of sidewalls which extend radially inward from both ends of the annular tread and a bead portion, provided at the inner end of each sidewall, wherein the belt includes a belt ply having a plurality of belt cords in parallel arrangement, the belt cords being formed by twisting a plurality of steel filaments or two or more strands each consisting of a plurality of steel filaments, and at least one of said steel filaments being replaced by a filament of a shape-memory alloy which, before it is twisted either as a belt cord or as a strand which forms a belt cord, has been heat set at a predetermined heat set temperature whereby the filament has a linear shape at a temperature below the heat set temperature and has a wavy shape at a temperature at or above the heat set temperature.

3 Claims, 4 Drawing Sheets

PNEUMATIC RADIAL TIRE WITH BELT CORDS HAVING AT LEAST ONE SHAPE-MEMORY ALLOY FILAMENT

BACKGROUND OF THE INVENTION

1. Field of the Invention

This invention relates to a pneumatic radial tire having a belt incorporated in the annular tread.

2. Description of Related Art

FIG. 6 shows a conventional pneumatic radial tire which comprises an annular tread b having a belt incorporated therein, a pair of sidewalls c that extend radially inward from the both ends of the annular tread b, and bead portions d which are provided at the inner ends of the sidewalls and each of which has a bead core.

During high-speed running, a strong centrifugal force is exerted on the annular tread b of the tire a, and under this centrifugal force, the annular tread b deforms radially outward as indicated by dashed line $b_1$, thereby causing "lifting" (an increased outside diameter of the tire).

The amount of tire deformation due to lifting is not uniform in the axial direction (i.e., the width direction of tire) of the annular tread b and, on account of the difference in the rigidity of the belt, the deformation of the shoulder at either end of the tread b is greater than the deformation of the center portion ($l_0 < l_1$).

The deformation due to lifting also increases the temperature of the shoulder and can potentially destroy the adhesion between rubber and the steel cords in the belt at the shoulder. In addition, the resulting change in the shape of the tire portion that contacts the road surface often causes poor maneuverability at high speed and insufficient grip property.

The conventional means of solving this problem is to improve the belt rigidity by either increasing the diameter or number of belt cords or providing a reinforcement layer which extends radially outward of the belt.

However, these methods increase the tire weight and are unable to meet the requirement for lighter tires, and the demand for a lighter tire is increasing today as the performance of vehicles is constantly improving. Further, an improvement in the belt rigidity leads to a higher tread rigidity and the resulting increase in the longitudinal rigidity of the tire taken as a whole will unavoidably lead to poor ride characteristics.

The increased tread rigidity often causes other problems including higher road noise, lower endurance and poor performance on wet surfaces.

SUMMARY OF THE INVENTION

The present invention has been accomplished under these circumstances and has an object providing a pneumatic tire that has excellent high-speed endurance, maneuverability and grip property, that is lighter in weight and that yet has a lower rolling resistance to insure a better ride.

This object of the present invention can be attained by a pneumatic radial tire comprising an annular tread having a belt incorporated therein, a pair of sidewalls which extend radially inward from both ends of the annular tread and a bead portion provided at the inner end of each sidewall, wherein said belt comprises a belt ply having a plurality of belt cords in parallel arrangement, said belt cords being formed by twisting a plurality of steel filaments or two or more strands each consisting of a plurality of steel filaments, and at least one of said steel filaments being replaced by a filament of a shape-memory alloy which, before it is twisted either as a belt cord or as a strand which forms a belt cord, been heat set at a predetermined heat set temperature whereby the filament has a linear shape at a temperature below the heat set temperature and a wavy shape at a temperature at or above the heat set temperature.

DETAILED DESCRIPTION OF THE INVENTION

In the present invention, the preferred heat set temperature is from 100° to 140° C.

In a preferred embodiment, the filament of the shape-memory alloy, before it is twisted either as a belt cord or as a strand which forms a belt cord, has been heat set in such a manner that it is linear in shape at a temperature lower than the heat set temperature but that it becomes wavy in shape at a temperature higher than the heat set temperature.

In another preferred embodiment, the belt is formed of two or more belt plies and the belt cords in individual belt plies cross each other at an angle (i.e., $\theta_1$ and $\theta_2$) of 5 to 40 degrees (preferably 15 to 25 degrees) with respect to the circumferential direction of the tire, as shown in FIG. 2 (a).

When the temperature of the annular tread in the pneumatic radial tire of the present invention rises during high-speed running so that the temperature of the belt exceeds the heat set temperature, the filament of a shape-memory alloy which is twisted in the belt cord would deform, for example, into a wavy shape but, in fact, the filament twisted as a belt cord is subject to a tension and hence is unable to deform.

Therefore, a stress builds up in the filament of a shape-memory alloy and its apparent elastic modulus will increase to thereby increase the out-of-plane bending rigidity of the belt while suppressing the out-of-plane bending deformation of the belt to reduce the amount of "lifting".

In particular, the shoulders of the tire become hotter than the other portions, so the out-of-plane bending rigidity of the belt at the shoulders will increase but the out-of-plane bending rigidity in outer portion (e.g., the crown, V as shown FIG. 5) will not increase. As a result, the occurrence of lifting is suppressed in the shoulders but is not suppressed in the other portions, whereby the amount of deformation due to lifting of the annular tread will become uniform in the axial direction (i.e., the width direction) of the tire and, at the same time, the deterioration of ride characteristics which would otherwise occur due to the increase in the overall belt rigidity can be prevented.

EXAMPLE

The preferred embodiment of the present invention is described below according to FIGS. 1-5.

Figure 1:
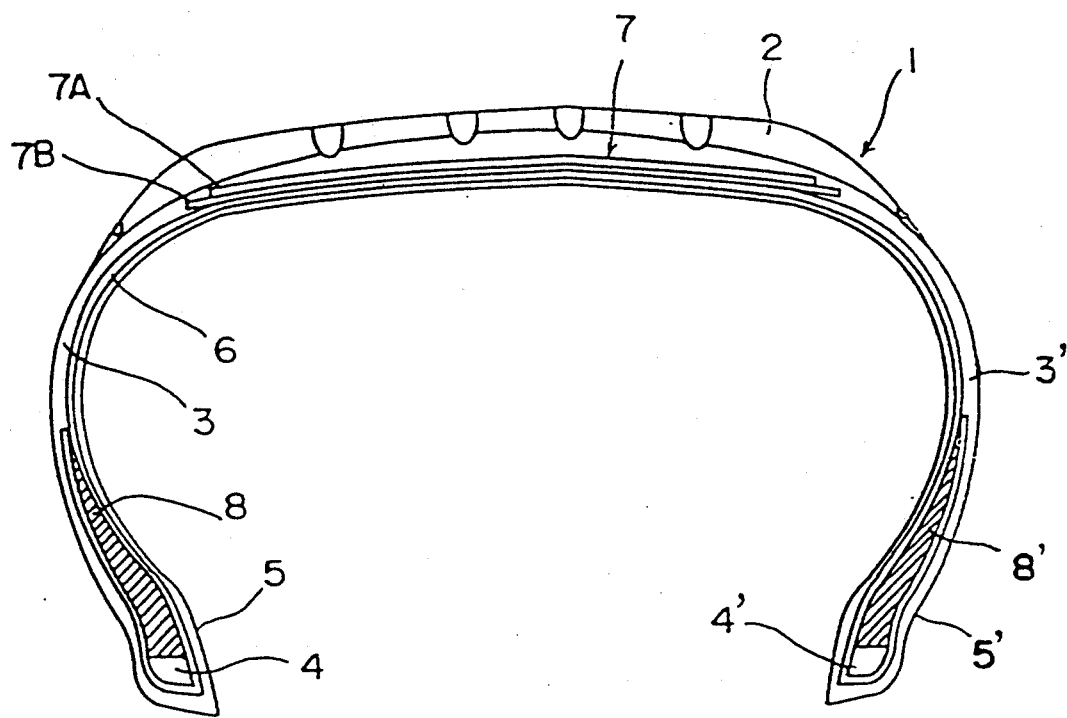
FIG. 1 is a cross-sectional view of the pneumatic radial tire of the present invention.

As shown in FIG. 1, the pneumatic radial tire of the present invention which is generally indicated by 1 comprises an annular tread 2, a pair of sidewalls 3 and, 3' that extend radially inward from both ends of the annular tread 2, and bead portions 5 and 5' which are provided radially inward of the sidewalls 3 and 3' and each of which has a bead core 4 and 4'.

Figure 5:
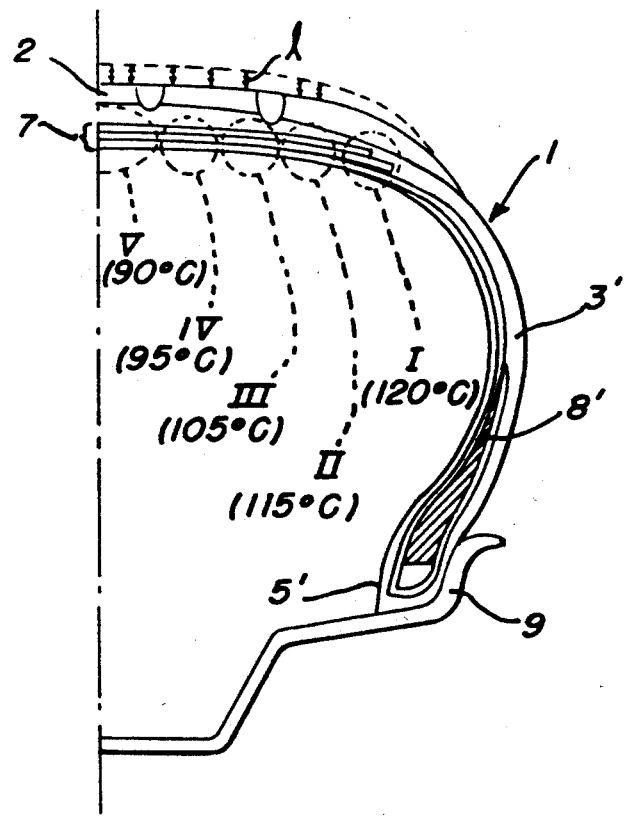
FIG. 5 is a diagram showing the operating principle of the pneumatic radial tire of the present invention.
Figure 6:
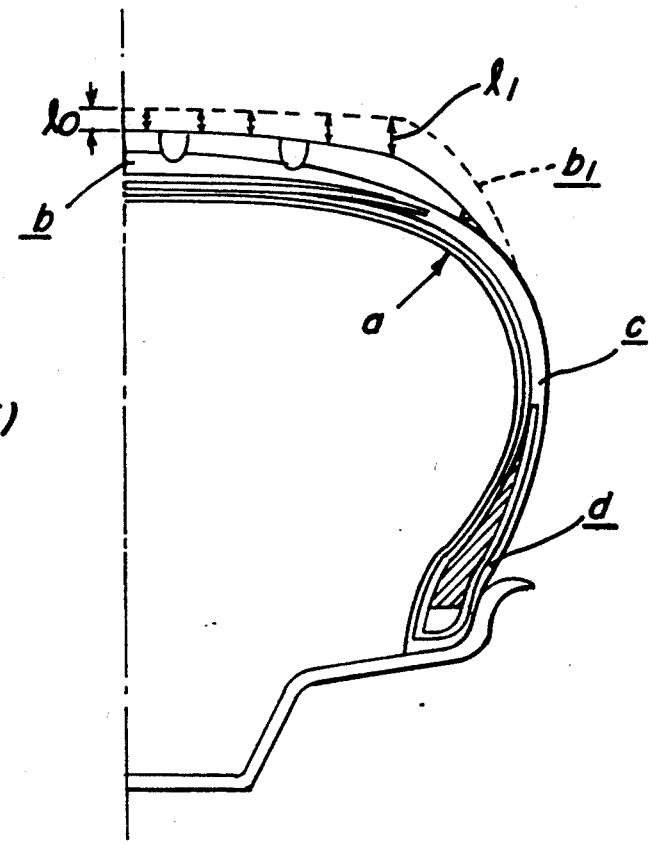
FIG. 6 is partial cross section showing how a conventional pneumatic radial tire deforms during high-speed running.

The pneumatic radial tire 1 contains a carcass 6, made of one or more plies, which passes under the annular tread 2 and through sidewalls 3 and 3' and the end part of which carcass is folded towards the outside around each of bead cores 4 and 4'. A strip of belt 7 is positioned under the annular tread 2 in an area that is radially outward of the carcass 6, and the bead apexes 8 and 8' are positioned radially outward of the bead cores 4 and 4'. The beads 5 and 5' are to be mounted on a wheel rim 9 (as shown in FIG. 5).

Figure 2A:
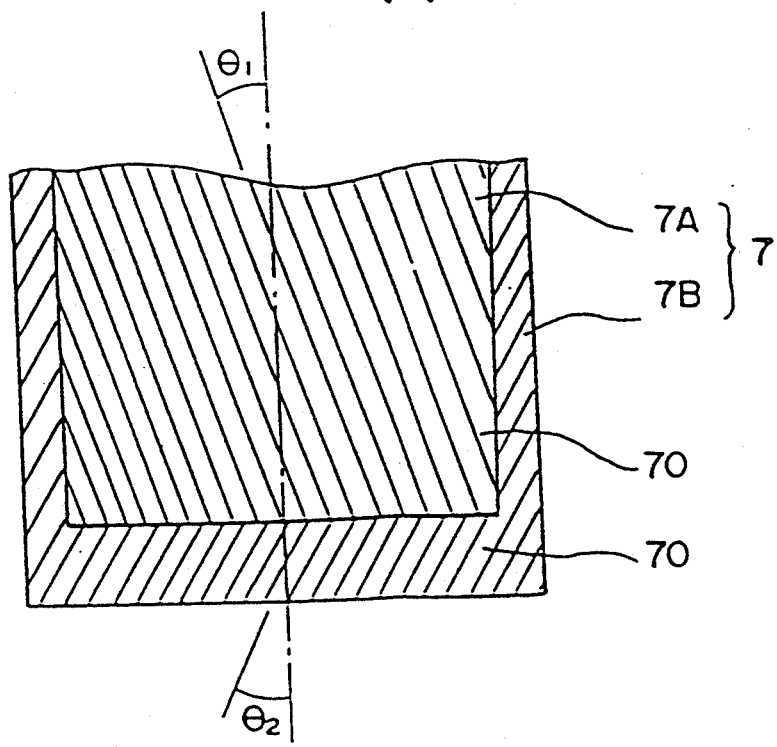
FIG. 2(a) is a plan view of the breaker.
Figure 2B:
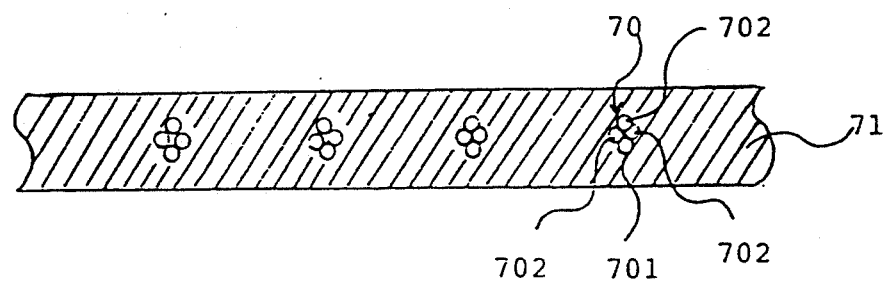
FIG. 2(b) is a cross sectional view of the belt.

As shown enlarged in FIG. 2(a), the belt 7 consists of an outer belt ply 7A and an inner belt ply 7B. Either belt ply consists of a number of belt cords 70 that are embedded in topping rubber 71 (as shown in FIG. 2(b)). The belt cords in the outer belt ply 7A are arranged parallel to one another at predetermined spacings and they are inclined by a predetermined angle $\theta_1$ with respect to the circumferential direction of the tire, and the belt cords in the inner belt ply 7B are also arranged parallel to one another at predetermined spacings but they are inclined by a predetermined angle $\theta_2$ in a direction opposite to the belt cords in the outer belt ply 7A.

Figure 3:
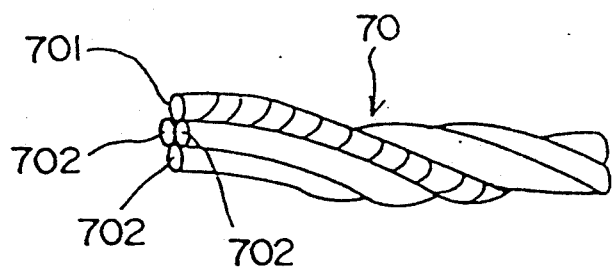
FIG. 3 is a perspective view of the belt cord.
Figure 4:
FIG. 4(a) is a perspective view showing a filament of shape-memory alloy at a temperature lower than the temperature at which it was heat set.
FIG. 4(b) is a perspective view of the same filament which is at a temperature higher than the heat set temperature.
Figure 4:

As shown in FIG. 3, each belt cord 70 is formed of at least one filament of a shape-memory alloy 701 which is twisted together with a plurality of steel filaments 702.

Before being twisted as belt cord 70, the filament of shape-memory alloy 701 is heat set at a predetermined heat set temperature Ts of 100° to 140° C. in such a way that it is linear in shape [as shown in FIG. 4(a)] at a temperature lower than Ts but that it becomes wavy in shape [as shown in FIG. 4(b)] if the temperature is not lower than Ts.

When the temperature of the annular tread in the pneumatic radial tire of the present invention having the structure described above rises during high-speed running so that the temperature of the belt exceeds the heat set temperature, the filament of the shape-memory alloy which is twisted in the belt cord would deform into a wavy shape but, in fact, that filament twisted as the belt cord is subject to a tension and hence is unable to deform.

Therefore, a stress builds up in the filament of the shape-memory alloy and its apparent elastic modulus will increase to thereby increase the out-of-plane bending rigidity of the belt while suppressing the out-of-plane bending deformation of the belt to reduce the amount of "lifting".

At the same time, as shown in FIG. 5, the shoulders (I and II) of the tire become hotter than the other portions such as the crown (V) and their temperature exceeds the heat set temperature Ts, so the out-of-plane bending rigidity of the belt at the shoulders (I and II) will increase due to their higher apparent elastic modulus but the out-of-plane bending rigidity of the belt in the other portions (III-V) will not increase. As a result, the occurrence of lifting is suppressed in the shoulders (I and II) but is not suppressed in the outer portions (III-V), whereby the amount of deformation due to lifting of the annular tread 2 will become uniform in the axial direction (i.e., the width direction) of the tire and, at the same time, the deterioration of ride characteristics that would otherwise occur due to the increase in the overall belt rigidity can be prevented.

The heat set temperature Ts is preferably within the range of 100° to 140° C. If Ts is lower than 100° C., the following problems occur. At a belt temperature of less than 100° C., the adhesion between the belt cords and rubber will not be destroyed and there is no need to enhance the belt rigidity. Nevertheless, the belt temperature exceeds Ts, causing an unwanted increase in the belt rigidity during running, which leads to poor ride characteristics.

In the tire manufacturing process, the step of curing with a vulcanizer is often followed by postcuring inflation (PCI), in which the tire inflated to a predetermined pneumatic pressure is cooled so as to stabilize the characteristics of the individual tire components and to make the tire dimensions uniform If the heat set temperature Ts is lower than the temperature of the belt in the tire immediately after PCI, the elastic modulus of the belt cords will increase upon removal of the inflation pressure imparted by PCI, so that the belt cords become highly prone to shrink, potentially causing abnormalities in the tire dimensions and shape.

If on the other hand, the heat set temperature Ts is higher than 140° C., it is only after the belt temperature becomes close to or higher than the temperature at which the adhesion between the belt cords and rubber is destroyed that the belt rigidity is increased to prevent the deformation due to lifting and this makes it difficult to improve the high-speed structural endurance performance of the tire. The foregoing description of the preferred embodiment of the present invention is directed only to belt cords which are formed by twisting a plurality of steel filaments including a filament of shape-memory alloy. It should, however, be noted that the present invention also encompasses the case where belt cords are formed by twisting two or more strands together, each stand being formed by twisting together a plurality of steel filaments including a filament of shape-memory alloy.

Having the structure described above, the pneumatic radial tire of the present invention offers the following advantages.

When the temperature of the annular tread in the pneumatic radial tire of the present invention rises during high-speed running so that the temperature of the belt exceeds the heat set temperature, the filament of a shape-memory alloy which is twisted in the belt cord would deform, for example, into a wavy shape but, in fact, the filament twisted as a belt cord is subject to a tension and hence is unable to deform. Therefore, a stress builds up in the filament of a shape-memory alloy and its apparent elastic modulus will increase to thereby increase the out-of-plane bending rigidity of the belt while suppressing the out-of-plane bending deformation of the belt to reduce the amount of "lifting".

In particular, the shoulders of the tire become hotter than the other portions, so the out-of-plane bending rigidity of the belt at the shoulders will increase but the out-of-plane bending rigidity in other of lifting is suppressed in the shoulders but is not suppressed in the other portions, whereby the amount of deformation due to lifting of the annular tread will become uniform in the axial direction of the tire and, at the same time, the deterioration of ride characteristics which would otherwise occur due to the increase in the overall belt rigidity can be prevented.

While the invention has been described in detail and with reference to specific embodiments thereof, it will be apparent to one skilled in the art that various changes and modifications can be made therein without departing from the spirit and scope thereof.

What is claimed is:

1. A pneumatic radial tire comprising:
an annular tread having a belt incorporated therein;
a pair of sidewalls which extend radially inward from both ends of the annular tread; and
a bead portion provided at an inner end of each sidewall, wherein said belt includes
a belt ply having a plurality of belt cords in parallel arrangement, said belt cords being formed by twisting a plurality of steel filaments or two or more strands each consisting of a plurality of steel filaments, and at least one of said steel filaments being replaced by a filament of a shape-memory alloy which has been heat set at a predetermined heat set temperature wherein said filament made of a shape-memory alloy, before it is twisted either as a belt cord or as a strand which forms a belt cord, has been heat set in such a manner that it is linear in shape at a temperature lower than the heat set temperature but becomes wavy in shape at a temperature equal to or higher than the heat set temperature.

2. The pneumatic radial tire according to claim 1, wherein said belt is formed of two or more belt plies and the belt cords in individual belt plies cross each other at an angle of 5 to 40 degrees with respect to the circumferential direction of the tire.

3. The pneumatic radial tire according to claim 1, wherein said predetermined heat set temperature is from 100° to 140°C.

* * * * *